Feb. 21, 1950     J. H. GOODE     2,497,986
ADJUSTABLE PIPE CONNECTION
Filed June 30, 1947

JOSEPH H. GOODE
*INVENTOR.*

BY Lester B. Clark
& Ray L. Smith
*ATTORNEYS*

Patented Feb. 21, 1950

2,497,986

UNITED STATES PATENT OFFICE 2,497,986

ADJUSTABLE PIPE CONNECTION

Joseph H. Goode, Houston, Tex.

Application June 30, 1947, Serial No. 758,156

3 Claims. (Cl. 285—2)

1

The invention relates to fluid couplings or connectors and in particular to fluid connectors that may be joined in fluid tight and mechanically locked, various longitudinal relationships.

In making up pipe connections, such as in the oil field, the person making the connection is never able to calculate the length of pipe required exactly so that he can be assured that when he attempts to connect the pipe together the pieces of pipe that he has at hand will fit the connection. It is almost always necessary that upon arriving at the last joint to be connected, that it is either necessary to add or cut off some six or seven inches of the pipe before the two connections meet so that a coupling may be joined therewith. It is, therefore, desirable that the person making the connection have on hand fluid connectors which can be adjusted longitudinally to either lengthen or shorten the connection as the case may be.

A difficulty heretofore encountered in trying to design this connection has been in attempting to obtain a connection that could be adjusted longitudinally on one hand, while having a connection on the other hand, wherein a seal could be effected between the parts arranged to move longitudinally which was capable of withstanding pressures in the order of 5,000 to 6,000 pounds per square inch.

An object, therefore, of the present invention is to provide a fluid connector construction, wherein the parts thereof may be quickly and easily adjusted in longitudinal relationship, there being seal means arranged in such fluid connector to provide a seal between the longitudinally movable parts.

Another object of the invention is to provide a fluid connector having a male and female member interconnected, the female member being of an increased internal diameter adjacent the male member so that when the two are connected together the flow passage through the connector will not be decreased.

Another object of the invention is to provide in a fluid or liquid connector comprising a male and female member, an unthreaded area on the male member arranged to engage seal means disposed in the female member so that a fluid seal is maintained between the male and female members along any contacted portion of the unthreaded area by the seal means.

Still another object of the invention is to provide in conjunction with a fluid tight connector, a double seal union which may be readily broken down for replacement or repair.

2

A still further object of the invention is to provide in a union of a fluid tight connector, a double seal joint which insures a positive fluid seal in such union.

Other objects and advantages of the invention will become readily apparent from a consideration of the following description and drawings, wherein.

Figure 1:
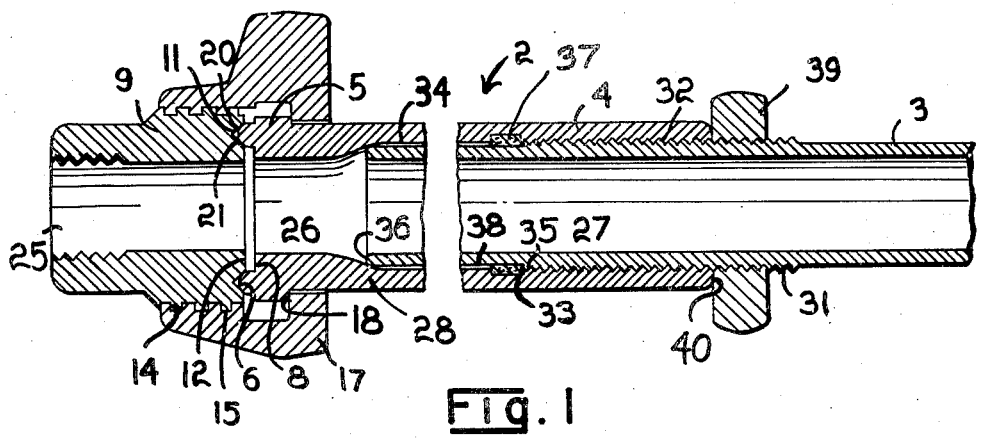
Fig. 1 is a vertical, sectional view showing an embodiment of the adjustable pipe connection.

In Fig. 1, the adjustable pipe connection is shown generally at 2, as comprising a male member 3 in engagement with a female member 4. The inner end 5 of the female member 4, is provided with an annular ridge 6 of substantially semi-circular cross section projecting from the end surface 8 of the inner end 5. A conduit member 9 has an end surface 12 opposed to the end surface of the inner end 5 of the female member 4 and this end surface 12 is provided with an annular groove 11 substantially V-shaped in cross section. Threads 14 on the outer surface of the member 9 are adapted to engage the threads 15 by suitable means, such as a nut 17 which engages a shoulder 18 adjacent the end 5 on the female member 4, which serves to position the annular ridge 6 into the groove 11 of the member 9.

Particular attention is directed to the fact that a double seal is formed by the annular ridge 6 contacting the sides 20 and 21 of the groove 11 in the member 9.

The passage 25 through the member 9 is of substantially the same diameter as the passage 26 through the female member 4 and as the passage 27 through the male member 3. This uniformity of flow passage diameter is obtained by flaring the inner end 5 of the female member 4 outwardly as at 28 so that the female member 4 is of an increased internal diameter to receive the male member 3 when the two are connected together. Such uniformity of flow passage thus obtained decreases turbulence of flow through the fluid connection and decreases the pressure loss there through.

The male member 3 and female member 4 may be connected together by any suitable means, and are shown as preferably being connected together in threaded engagement. To this end, threads of the externally threaded section 31 of the male member 3 are adapted to engage the threads of the internally threaded section 32 of the female member 4. However the threads of the section 32 on such female member do not extend inwardly the full length of the male member but instead terminate at the point 33.

From this point, the female member has the bore or socket 34 therein of a size to receive the male member 3 up to the flared end of the female member 4. The threads on the central section 31 of the male member 3 extend along the surface thereof to the point 35 and then from this point to the end 36 of the male member 3, the end portion 38 of such male member is unthreaded and of an outer diameter substantially equal to the root diameter of the threads 33 in the female member 4.

Arranged at any suitable point on the inner surface of the female member 4 within the socket 34 and preferably adjacent the inner termination of the threaded end section 32 of the female member 4, the groove 33 is provided to receive suitable seal means, such as the seal ring 37 is provided. This seal ring may be of any suitable construction, but it has been found that a lip type seal ring is preferable so that any fluid under pressure tending to pass between the male and female members will contact such lip seal so as to expand it and form a seal with the male member 3 so that the fluid may not pass outwardly between the threaded sections 31 and 32.

It seems obvious that the greater the pressure exerted against this lip seal the stronger will be the seal against this seal ring and the male member.

Threaded on the threaded section 31 of the male member 3 is a jam nut 39 which is arranged to contact the outer end 40 of the female member 4 to mechanically lock the male and female members in position.

Figure 2:
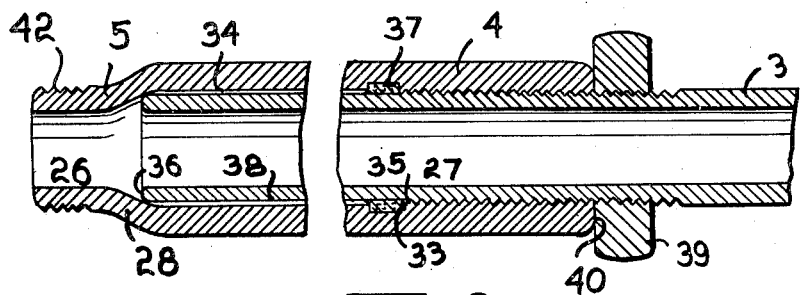
Fig. 2 is a vertical, sectional view showing an alternative construction of the adjustable pipe connection.
Figure 3:
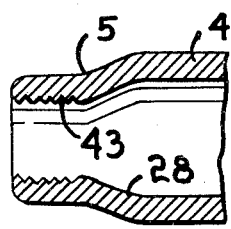
Fig. 3 is a vertical, sectional view of a portion of Fig. 2 showing an alternate construction thereof.

Fig. 2 shows a male member 3 and a female member 4 in engagement. This construction is quite similar to that shown in Fig. 1, with the exception that the inner end 5 of the female member is provided with suitable means such as the threaded section 42, arranged to engage in any suitable pipe joint or union. The construction represented in Fig. 3, shows the inner end 5 of the female member 4, as being provided with internally threaded section 43.

It seems obvious that either external or internal threads can be used in the end of the members to effect connection in a system.

While it is believed that the operation of the invention is sufficiently clear from the foregoing, the following will be given to further amplify and describe the invention.

It is to be assumed that the pipe connection shown in the present invention is to be used, wherein it is desirable that the members 3 and 4 be moved longitudinally to a predetermined point so as to increase the effective length of the connection. The jam nut 39 will be moved away from the end 40 of the female member 4 and the male member 3 may then be rotated so that it tends to withdraw from the female member 4. After the desired length has been obtained, the jam nut is moved back into position against the female member at 40 so that the connection is now mechanically locked.

Particular attention is directed to the fact that a seal is maintained so long as the seal ring 37 is in contact with any portion of the unthreaded end portion 34 of the male member 3. This permits the members 3 and 4 to be moved longitudinally relative to each other, while maintaining a seal therebetween. Of course, the situation at hand will determine whether or not the construction shown in Figs. 1, 2, or 3 is used.

An adjustable pipe connection in accordance with this invention has been used in making up connections in the oil field and has been found to be particularly adaptable since it obviates the necessity of adding a short piece of pipe to a connection that is not quite long enough or cutting off a piece of pipe that leads into the connection that is too long. While the invention has been directed as being particularly adaptable to the oil industry, it seems obvious that such connection could be readily adapted to be used in any type flow line where fluids are to be conducted.

Broadly the invention contemplates a fluid connector, and it particularly contemplates to adjustable fluid connectors that may be joined in fluid tight and mechanically locked, various longitudinal relationships.

What is claimed is:

1. In a coupling, the combination of, a female member having a flow passage through a first end thereof communicating with a socket of larger than flow passage diameter terminating in an internally threaded other end, a male member having a passage therethrough of substantially the diameter of said flow passage and having an externally threaded central section and a reduced outer diameter end portion of substantially the thread root diameter of said externally threaded section to extend within said socket when said threaded other end and said threaded section are in engagement, a seal ring surrounding said end portion and compressed thereagainst by said female member to seal against pressure fluid passing outwardly between said threaded sections, a conduit member having an end surface opposed to the end surface of said female member first end, and clamping means for connecting said conduit member end surface and said female member first end into sealing engagement.

2. In a coupling, the combination of, a female member having a flow passage through a first end thereof communicating with a socket of larger than flow passage diameter terminating in an internally threaded other end, a male member having a passage therethrough of substantially the diameter of said flow passage and having an externally threaded central section and a reduced outer diameter end portion of substantially the thread root diameter of said externally threaded section to extend within said sockets when said threaded other end and said threaded section are in engagement, a seal ring within said female member and said socket surrounding said end portion and compressed thereagainst by said female member to seal against pressure fluid passing outwardly between said threaded sections, a conduit member having an end surface opposed to the end surface of said female member first end, clamping means for connecting said conduit member end surface and said female member first end into sealing engagement, and means to lock said female member and male member against longitudinal motion thereinbetween.

3. In a coupling, the combination of, a female member having a flow passage through a first end thereof communicating with a socket of larger than flow passage diameter terminating in an internally threaded other end, a male member having a passage therethrough of substantially the diameter of said flow passage and having an externally threaded central section and a reduced outer diameter end portion of substantially the thread root diameter of said externally threaded section to extend within said socket when said threaded other end and said threaded section are in engagement, a seal ring within said female member and said socket surrounding said end portion and compressed thereagainst by said female member to seal against pressure fluid passing outwardly between said threaded sections, said female member first end having an annular ridge of substantially semi-circular cross-section in the end surface thereof, a conduit member having an annularly grooved end surface opposed to the end surface of said female member first end, clamping means for connecting said conduit member end surface and said female member first end to bring said groove and said ridge into sealing engagement.

JOSEPH H. GOODE.

REFERENCES CITED

The following references are of record in the file of this patent:

UNITED STATES PATENTS

| Number | Name | Date |
|---|---|---|
| 244,157 | Allison et al. | July 12, 1881 |
| 1,590,357 | Feisthamel | June 29, 1926 |
| 2,282,552 | Banowetz | May 12, 1942 |
| 2,449,588 | Clafford | Sept. 21, 1948 |